US007778409B2

(12) United States Patent
Karam

(10) Patent No.: US 7,778,409 B2
(45) Date of Patent: Aug. 17, 2010

(54) ENABLING CISCO LEGACY POWER TO SUPPORT IEEE 802.3 AF STANDARD POWER

(75) Inventor: Roger A. Karam, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 740 days.

(21) Appl. No.: 11/004,169

(22) Filed: Dec. 3, 2004

(65) Prior Publication Data

US 2005/0141698 A1 Jun. 30, 2005

Related U.S. Application Data

(63) Continuation of application No. 10/360,338, filed on Feb. 6, 2003, now Pat. No. 6,912,282.

(51) Int. Cl.
*H04M 1/00* (2006.01)

(52) U.S. Cl. .................. 379/413; 379/403; 379/413.01; 379/413.02; 379/413.03; 713/300; 713/310; 713/320

(58) Field of Classification Search ................. 379/413, 379/399.01, 401, 413.04, 403, 413.01–413.03, 379/387.01, 388.06, 395, 423; 713/300, 713/310, 320, 323
See application file for complete search history.

(56) References Cited

U.S. PATENT DOCUMENTS

| | | | |
|---|---|---|---|
| 5,406,260 | A | 4/1995 | Cummings et al. |
| 5,424,710 | A | 6/1995 | Baumann |
| 5,459,283 | A * | 10/1995 | Birdwell, Jr. ................. 84/737 |
| 5,947,773 | A | 9/1999 | Karam |
| 6,094,363 | A | 7/2000 | Cheng |

(Continued)

FOREIGN PATENT DOCUMENTS

EP 1 100 226 10/2000

(Continued)

OTHER PUBLICATIONS

"33. Data Terminal Equipment (DTE) Power Via Media Dependent Interface (MDI)", IEEE Draft, P802.3af/D3.2, Sep. 5, 2002, pp. 35-38.

(Continued)

*Primary Examiner*—Tuan A Pham
(74) *Attorney, Agent, or Firm*—BainwoodHuang

(57) ABSTRACT

An apparatus and method for enabling Cisco legacy power to support IEEE 802.3af standard power. A network power system capable of delivering data terminal equipment power via a media dependent interface (MDI) includes power source equipment according to a first power via MDI scheme such as Cisco legacy power and at least one powered device according to a second power via MDI scheme such as IEEE standard power. A power compatibility module is inserted between the power source equipment and the powered device to enable the power source equipment to appear according to the first power via MDI scheme and the powered device to appear according the second power via MDI scheme. In one embodiment, the module includes switches, a DC/DC converter, an IEEE power source equipment circuit, and an isolator. The module may optionally include a user signaling device for communicating operating conditions of the module to a user.

20 Claims, 4 Drawing Sheets

U.S. PATENT DOCUMENTS

| | | | | |
|---|---|---|---|---|
| 6,115,468 | A | 9/2000 | De Nicolo | |
| 6,218,930 | B1 * | 4/2001 | Katzenberg et al. | 370/200 |
| 6,262,567 | B1 * | 7/2001 | Bartlett | 323/303 |
| 6,295,356 | B1 | 9/2001 | De Nicolo | |
| 6,310,781 | B1 | 10/2001 | Karam | |
| 6,347,949 | B1 | 2/2002 | Edwards et al. | |
| 6,396,391 | B1 * | 5/2002 | Binder | 340/538.15 |
| 6,411,991 | B1 * | 6/2002 | Helmer et al. | 709/217 |
| 6,448,899 | B1 | 9/2002 | Thompson | |
| 6,456,049 | B2 | 9/2002 | Tsuji | |
| 6,541,878 | B1 | 4/2003 | Diab | |
| 6,625,042 | B2 | 9/2003 | Tolle et al. | |
| 2002/0118023 | A1 * | 8/2002 | Ewalt et al. | 324/539 |
| 2003/0087670 | A1 * | 5/2003 | Muir | 455/557 |
| 2003/0099076 | A1 * | 5/2003 | Elkayam et al. | 361/90 |
| 2003/0112965 | A1 * | 6/2003 | McNamara et al. | 379/399.01 |
| 2003/0146765 | A1 * | 8/2003 | Darshan et al. | 324/539 |
| 2003/0162449 | A1 * | 8/2003 | Abbarin | 439/894 |
| 2004/0073597 | A1 * | 4/2004 | Caveney et al. | 709/200 |
| 2004/0195984 | A1 * | 10/2004 | Richey, II | 318/109 |

FOREIGN PATENT DOCUMENTS

| | | | |
|---|---|---|---|
| WO | WO 9623377 | * | 8/1996 |

OTHER PUBLICATIONS

"IEEE Draft P802.3af/D4.3", Apr. 2003, IEEE Standards Department, Draft Amendment 802-3-2002.

Mitchell, Robert L., "Legacy Equipment May Raise Compatibility Issues for 802.3af", May 26, 2003, printed from http://www.computerworld.com/printthis/2003/0,4814,81443,00.html on Aug. 6, 2004.

* cited by examiner

ENABLING CISCO LEGACY POWER TO SUPPORT IEEE 802.3 AF STANDARD POWER

CROSS REFERENCE TO RELATED APPLICATION

This application is a continuation application based on U.S. patent application Ser. No. 10/360,338, filed on Feb. 6, 2003 now U.S. Pat. No. 6,912,282.

FIELD OF THE INVENTION

The present invention relates generally to a network power system including power source equipment, at least one powered device, and transmission media. More specifically, the present invention relates to a network power system including non-IEEE standard power source equipment and at least one IEEE standard powered device.

BACKGROUND OF THE INVENTION

In the field of networks, there are instances when it is desired or required that data terminal equipment (DTE) be able to draw power from the same generic cabling as that used for data transmission. DTE devices may include telephones, Voice over Internet Protocol (VoIP or IP or Ethernet) telephones, network access devices, computers, and the like. Such a power scheme is known as phantom power or power via a media dependent interface (MDI). Various example power via MDI schemes exist. These include a proprietary scheme from Cisco Systems, Inc. (Cisco) and a standard scheme from the Institute of Electrical and Electronics Engineers (IEEE). The proprietary scheme from Cisco will be referred to as Cisco legacy power. The IEEE scheme is known as IEEE 802.3af standard power and will be referred to as IEEE standard power. Although the two schemes have some aspects in common, they are not entirely compatible with one another.

Turning first to FIG. 1, a schematic diagram of a network power system 10 having power source equipment (PSE) 12, a plurality of powered devices (PD) 14A-N, and a plurality of corresponding transmission media 16A-N is shown. The plurality of transmission media 16A-N are connected to the corresponding power source equipment 12 and powered devices 14A-N through a power interface at each end of the transmission media. Each transmission media may contain a plurality of conductors. For example, the current Ethernet standard is a minimum of two twisted-pair cables for a total of four conductors. The length and routing of the transmission media will depend on the circumstances and the applicable communications protocol. The number and location of each of the plurality of powered devices 14A-N will depend on the circumstances. The power source equipment 12 may also be variously located based on the circumstances. The multiple power interfaces of the power source equipment 12 are often referred to as ports. The number of ports will vary. Typically, one port is connected to one powered device. The multiple transmission media are often referred to as links between the power source equipment and the various powered devices. Each link includes at least two data and power signal paths with one for transmitting and one for receiving. In order for the network power system 10 to operate correctly, the power source equipment 12 and the plurality of powered devices 14A-N must be compatible with one another.

BRIEF SUMMARY OF THE INVENTION

An apparatus and method for enabling Cisco legacy power to support IEEE 802.3af standard power is disclosed. A network power system capable of delivering data terminal equipment (DTE) power via a media dependent interface (MDI) includes power source equipment (PSE) according to Cisco legacy power and at least one powered device (PD) according to IEEE standard power. A power compatibility module is inserted between the power source equipment and the powered device to enable the power source equipment to appear according to IEEE standard power and the powered device to appear according to Cisco legacy power. In one embodiment, the module includes switches, a DC/DC converter, an IEEE power source equipment circuit, and an isolator. The module may optionally include a user signaling device for communicating operating conditions of the module to a user. The module may be connected to two ports of the power source equipment to supply adequate power levels to the powered device.

BRIEF DESCRIPTION OF THE DRAWINGS

The accompanying drawings, which are incorporated into and constitute a part of this specification, illustrate one or more exemplary embodiments of the present invention and, together with the detailed description, serve to explain the principles and exemplary implementations of the invention.

In the drawings.

DETAILED DESCRIPTION OF THE INVENTION

Various exemplary embodiments of the present invention are described herein in the context of an apparatus and method for enabling Cisco legacy power to support IEEE standard power. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to exemplary implementations of the present invention as illustrated in the accompanying drawings. The same reference indicators will be used throughout the drawings and the following detailed descriptions to refer to the same or like parts.

In the interest of clarity, not all of the routine features of the exemplary implementations described herein are shown and described. It will of course, be appreciated that in the development of any such actual implementation, numerous implementation-specific decisions must be made in order to achieve the specific goals of the developer, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In addition, one of ordinary skill in the art will recognize that devices of a less general purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

In the context of the present invention, the term “network” includes local area networks (LANs), wide area networks (WANs), the Internet, cable television systems, telephone systems, wireless telecommunications systems, fiber optic networks, ATM networks, frame relay networks, satellite communications systems, and the like. Such networks are well known in the art and consequently are not further described herein.

Figure 1:
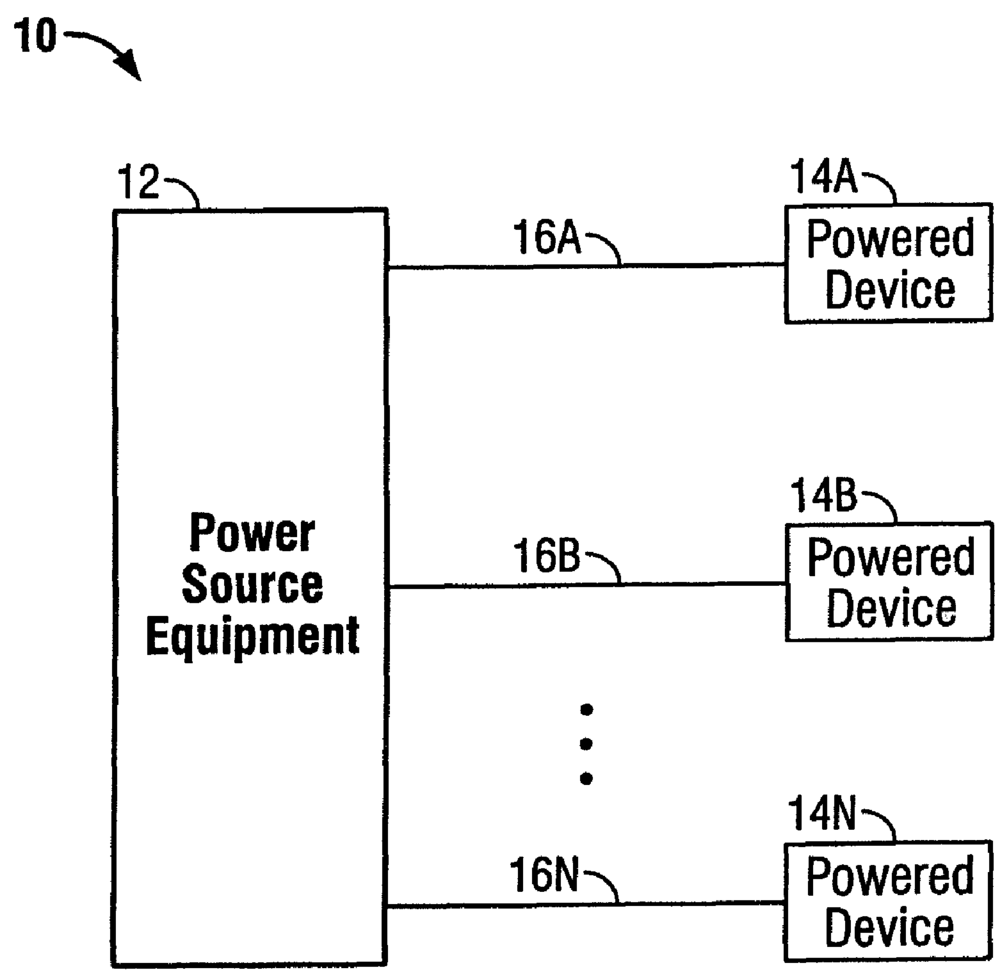
FIG. 1 is a schematic diagram of a network power system having power source equipment, a plurality of powered devices, and a plurality of corresponding transmission media.
Figure 2:
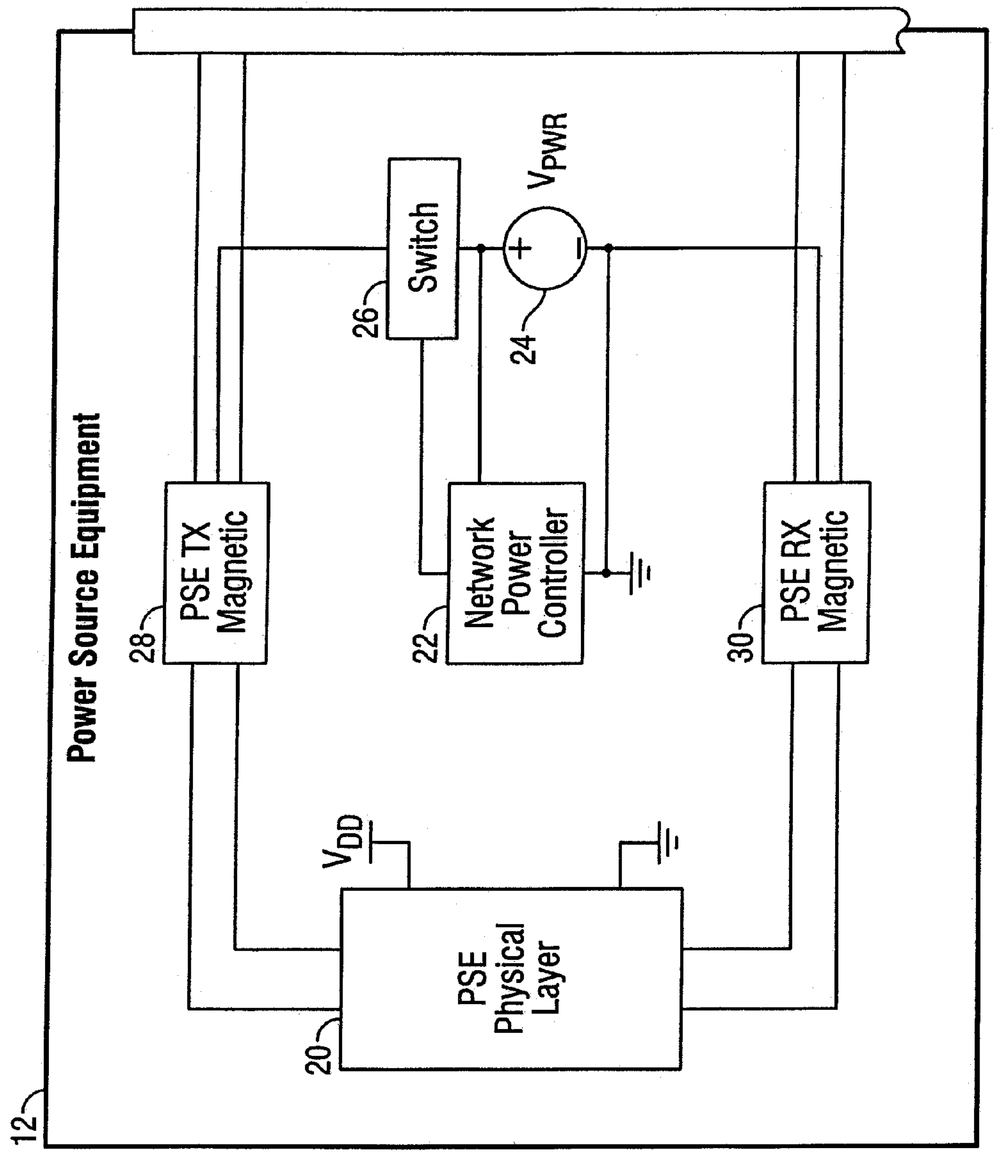
FIG. 2 is a schematic diagram according to Cisco legacy power of the power source equipment as in FIG. 1.

Turning now to FIG. 2, a schematic diagram according to Cisco legacy power of the power source equipment 12 as in FIG. 1 is shown. In the interest of clarity, only the pertinent portions of one power interface are shown. The remaining power interfaces are similar. The power source equipment 12 includes a power source equipment (PSE) physical layer 20, a network power controller (NPC) 22, an output power voltage (VPWR) 24, a switch 26, a PSE transmit (TX) magnetic 28, and a PSE receive (RX) magnetic 30. The NPC 22 monitors the output power voltage 24 and regulates the voltage level through the switch 26. The NPC regulated power is applied to the PSE transmit and receive magnetics 28 and 30. During data communication, a series of output data signals are generated and a series of input data signals are received. The signals may be simultaneous or alternating. An output data signal is generated by the PSE physical layer 20 and applied to the PSE transmit magnetic 28 for transmission to a powered device connected to the port. For example, the powered device might be the first powered device 14A of FIG. 1 that is connected to the power source equipment 12 by the first transmission media 16A of FIG. 1. An input data signal that is generated by the powered device connected to the port is received by the PSE receive magnetic 30 and passed to the PSE physical layer 20. The power source equipment 12 performs many functions which may include searching the link for a PD, supplying power to the link only if a PD is detected, monitoring the power on the link, and removing power from the link when the PD is disconnected. How these functions are performed differs from Cisco legacy power to IEEE standard power and accounts for some of the incompatibility between the two power via MDI schemes.

Figure 3:
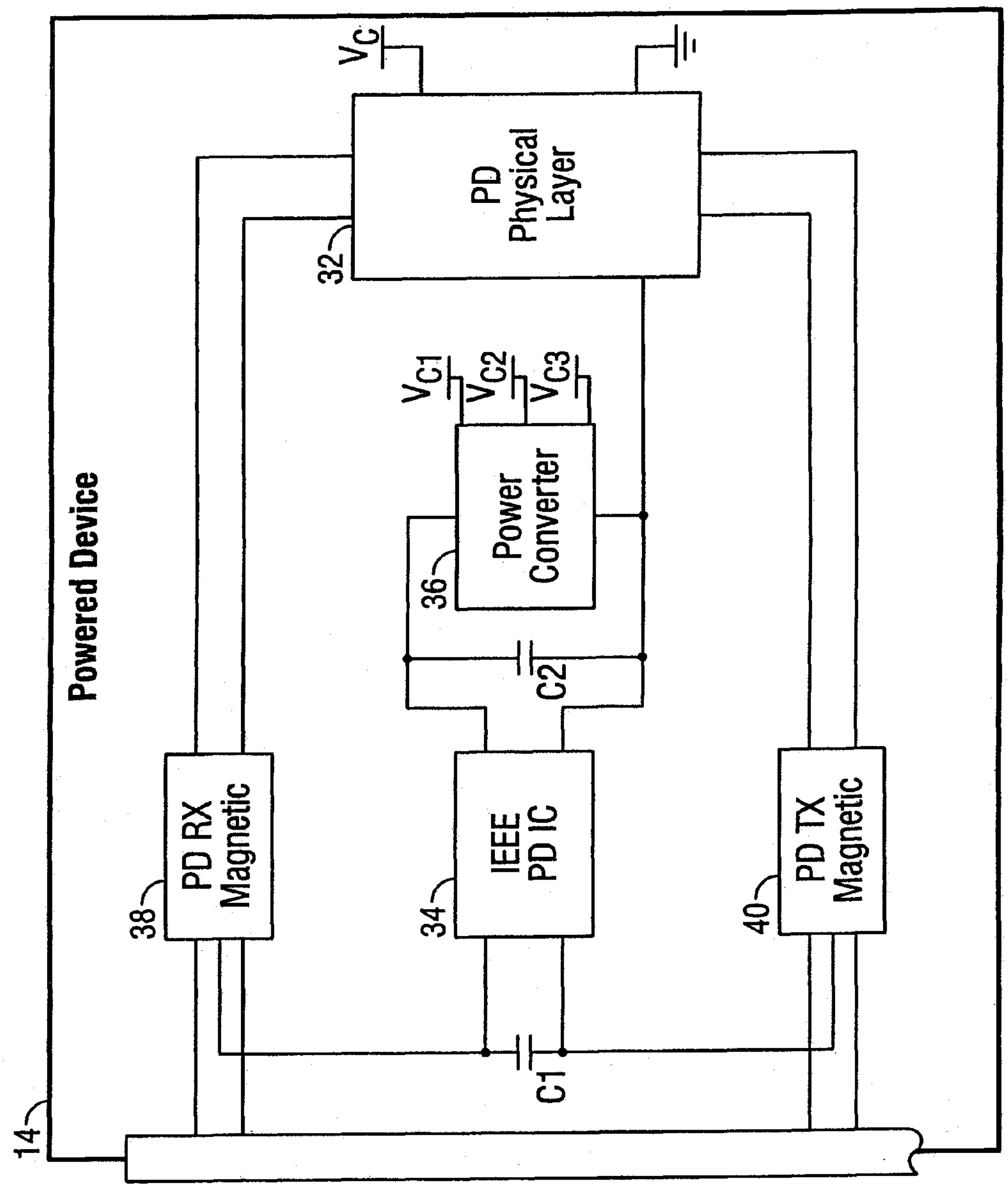
FIG. 3 is a schematic diagram according to IEEE standard power of the powered device as in FIG. 1.

Turning now to FIG. 3, a schematic diagram according to IEEE standard power of the powered device 14 as in FIG. 1 is shown. Similar to above, only the pertinent portions of the power interface are shown. The powered device 14 includes a powered device (PD) physical layer 32, an IEEE PD integrated circuit (IC) 34, a power converter 36, a first capacitor C1, a second capacitor C2, a PD RX magnetic 38, and a PD TX magnetic 40. The IEEE PD IC 34 is a chip that performs the PD functions of the power scheme according to IEEE standard power. During data communication, a series of input data signals are received and a series of output data signals are generated. The signals may be simultaneous or alternating. An input data signal that is generated by the power source equipment is received by the PD receive magnetic 38 and passed to the PD physical layer 32. An output data signal is generated by the PD physical layer 32 and applied to the PD transmit magnetic 40 for transmission to the power source equipment. The IEEE PD IC 34 receives the input phantom power over the link and passes it to the power converter 36 which generates one or more power levels. The power level may depend in part on which classification of device the powered device 14 is according to IEEE standard power. IEEE standard power has a number of predefined power classes and Cisco legacy power does not. This represents potentially one more of the incompatibilities. However, PD classification is not strictly necessary at this time. Nevertheless, the power demands of some of IEEE power classes may be beyond the power supply capabilities of the power source equipment according to Cisco legacy power which does represent an incompatibility between the two power schemes. The various incompatibilities of the power source equipment according to Cisco legacy power and the powered devices according to IEEE standard power can substantially be addressed.

Figure 4:
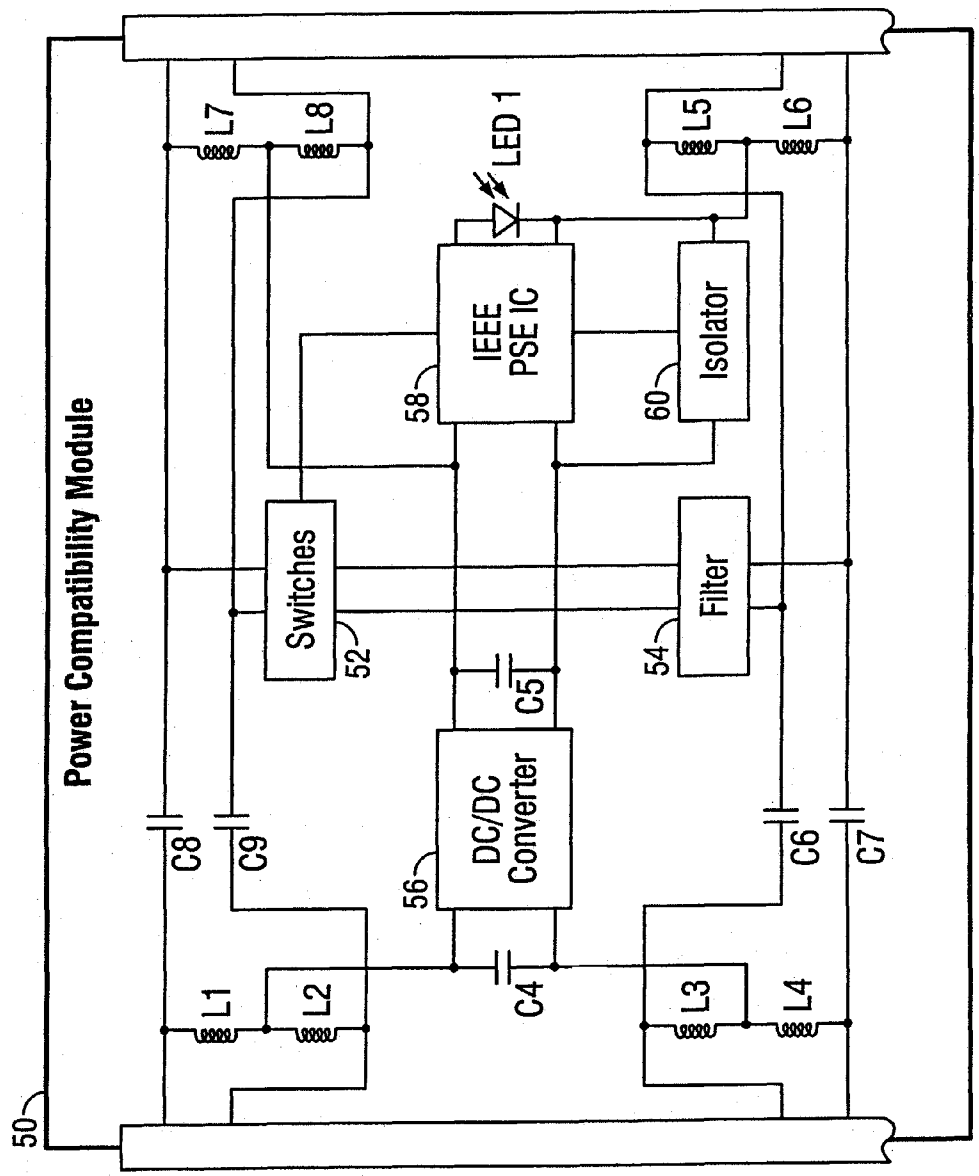
FIG. 4 is a schematic diagram of an embodiment of a power compatibility module according to the present invention.

Turning now to FIG. 4, a schematic diagram of an embodiment of a power compatibility module 50 according to the present invention is shown. The module 50 is inserted into the link between the power source equipment and the powered device. One convenient location would be closely before the powered device. It would also be possible to incorporate the module 50 into the powered device making the powered device both Cisco legacy power and IEEE standard power compatible. Rather than one module 50 for each powered device, it would also be possible to combine several modules 50 together. The module 50 includes switches 52, an optional filter 54, a DC/DC converter 56, an IEEE power source equipment integrated circuit (PSE IC) 58, an isolator 60, six capacitors C4-C9, eight inductors L1-L8, and an optional LED 1. The switches 52 and optional filter 54 play roles in how the power source equipment according to Cisco legacy power detects a compatible phantom powered device using differential mode signaling. The switches 52 are controlled by the IEEE PSE IC 58 which is a chip that performs the PSE functions of the power scheme according to IEEE standard power. The switches 52 and the IEEE PSE IC 58 work together to enable the power source equipment and the powered device to work together. The switches 52 help to make the powered device according to IEEE standard power to appear as a powered device according to Cisco legacy power. Likewise, the IEEE PSE IC 58 helps to make the power source equipment according to Cisco legacy power to appear as a power source equipment according to IEEE standard power. The isolator 60 works with the IEEE PSE IC 58 in accordance with IEEE standard power. The DC/DC converter 56 performs functions such as boosting the input phantom power voltage and isolating the input from the output. Depending on the circumstances, it may be the case that the voltage level supplied by the power source equipment according to Cisco legacy power is too low for the power class of the powered device according to IEEE Standard power. The DC/DC converter 56 may correct for the under voltage condition. The optional LED 1 could be employed as a user signaling device to signal various operating conditions of the module 50 to the user. The LED states of on, off, or flashing could be used to indicate proper or improper functioning. For example, the off state might indicate no power flow, the on state might indicate power flow, and the flashing state might indicate insufficient or intermediate power flow. More than one LED might also be provided to further indicate various link conditions such as short or open.

As mentioned above, the power demands of some of the IEEE power classes may be beyond the power supply capabilities of the power source equipment according to Cisco legacy power. One solution is to decline to support such power classes. In this case, the optional LED 1 might be used to signal the user that the module 50 is unable to power the connected powered device. Another solution is to combine the power of two ports from the power source equipment. This can be accomplished by connecting two ports to the input of the module 50 and one powered device to the output of the module 50. In this case, the optional LED 1 might be used to signal the user that the power demand at the output of the module 50 is actually greater or is classed to be greater than the power supplied at the input of the module 50. This would indicate to the user that if only one input is connected, then a second input might be necessary. The power supplied by two ports should be sufficient for any of the power classes that are compliant with IEEE standard power.

As an alternative to the embodiment of FIG. 4, it would be possible to change control of the switches 52 from the IEEE PSE IC 58 to the user. In such a case, the control line to the IEEE PSE IC 58 could be deleted and an on demand user control such as a button would be added. To establish power, the user would press and hold the button that closed the switches 52 until the LED 1 indicated that proper power was flowing to the PD. After proper power flow had been established, then the user would release the button and thereby the switches 52 would return to a normally open position. As above, the filter 54 is optional.

As a further alternative to the embodiment of FIG. 4, it would be possible to locate the DC/DC converter 56 inside of the powered device rather than inside of the module 50. as shown. In such a case, the DC/DC converter 56 and the capacitor C5 would be deleted from the module 50 and the input of the IEEE PSE IC 58 would be connected across the capacitor C4.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for providing, by a power compatibility module, compatibility to a network power system having equipment capable of at least two power via Media Dependent Interfaces (MDI) schemes for delivering data terminal equipment power via an MDI, the network power system including power source equipment (PSE) configured to deliver power via a first power via MDI scheme and a powered device (PD) coupled to the PSE and configured to receive power from the PSE via a second power via MDI scheme different from the first power via MDI scheme, the method comprising:

exchanging, by the power compatibility module, classification signals with the PD to classify a power class of the PD;

in response to classifying the PD as an IEEE PD configured to receive power according to an IEEE power classification, receiving, by the power compatibility module, a power signal from the PSE at a first power level according to the first power via MDI scheme and converting, by the power compatibility module, the power signal to a power level corresponding to the IEEE power classification of the PD, the power level corresponding to the IEEE power classification of the PD associated with the second power via MDI scheme;

facilitating, by the power compatibility module, the PSE to operate according to the first power via MDI scheme while appearing to the PD to be operating according to the second power via MDI scheme; and facilitating, by the power compatibility module, the PD to operate according to the second power via MDI scheme while appearing to the PSE to be operating according to the first power via MDI scheme;

wherein facilitating the PD to operate according to the second power via MDI scheme while appearing to the PSE to be operating according to the first power via MDI scheme comprises forwarding, by the power compatibility module, the power signal to the PD via the second power via MDI scheme.

2. The method as defined in claim 1, wherein the first power via MDI scheme is Cisco legacy power.

3. The method as defined in claim 2, wherein the second power via MDI scheme is IEEE standard power.

4. The method as defined in claim 1, wherein the second power via MDI scheme is IEEE standard power.

5. An apparatus for providing compatibility to a network power system having equipment capable of at least two power via Media Dependent Interfaces (MDI) schemes for delivering data terminal equipment power via an MDI, the network power system including power source equipment (PSE) configured to deliver power via a first power via MDI scheme and a powered device (PD) coupled to the PSE and configured to receive power from the PSE via a second power via MDI scheme different from the first power via MDI scheme, the apparatus comprising:

means for exchanging classification signals with the PD to classify a power class of the PD;

in response to classifying the PD as an IEEE PD configured to receive power according to an IEEE power classification, means for receiving a power signal from the PSE at a first power level according to the first power via MDI scheme and means for converting the power signal to a power level corresponding to the IEEE power classification of the PD, the power level corresponding to the IEEE power classification of the PD associated with the second power via MDI scheme;

means for operating the PSE according to the first power via MDI scheme while appearing to the PD to be operating according to the second power via MDI scheme; and means for operating the PD according to the second power via MDI scheme while appearing to the PSE to be operating according to the first power via MDI scheme;

wherein means for operating the PD to operate according to the second power via MDI scheme while appearing to the PSE to be operating according to the first power via MDI scheme comprises means for forwarding the power signal to the PD via the second power via MDI scheme.

6. The apparatus as defined in claim 5, wherein the first power via MDI scheme is Cisco legacy power.

7. The apparatus as defined in claim 6, wherein the second power via MDI scheme is IEEE standard power.

8. The apparatus as defined in claim 5, wherein the second power via MDI scheme is IEEE standard power.

9. A network power system for delivering data terminal equipment (DTE) power via a media dependent interface (MDI), the system comprising:

a power source equipment (PSE) configured to deliver power via a first power via MDI scheme;

a DTE adapted to receive power from the PSE via a second power via MDI scheme different from the first power via MDI scheme; and a power compatibility module coupled to the PSE and the DTE, wherein the power compatibility module is configured to:

exchange classification signals with the PD to classify a power class of the PD;

in response to classifying the PD as an IEEE PD configured to receive power according to an IEEE power classification, receive a power signal from the PSE at a first power level according to the first power via MDI scheme and convert the power signal to a power level corresponding to the IEEE power classification of the PD, the power level corresponding to the IEEE power classification of the PD associated with the second power via MDI scheme;

facilitate the PSE to operate according to the first power via MDI scheme while appearing to the DTE to be operating according to the second power via MDI scheme; and facilitate the DTE to operate according to the second power via MDI scheme while appearing to the PSE to be operating according to the first power via MDI scheme;

wherein when facilitating the PD to operate according to the second power via MDI scheme while appearing to the PSE to be operating according to the first power via MDI scheme the power compatibility module is configured to forward the power signal to the PD via the second power via MDI scheme.

10. The system as defined in claim 9, wherein the first power via MDI scheme is Cisco legacy power.

11. The system as defined in claim 10, wherein the second power via MDI scheme is IEEE standard power.

12. The system as defined in claim 9, wherein the second power via MDI scheme is IEEE standard power.

13. The method of claim 1, wherein:

facilitating the PSE to operate according to the first power via MDI scheme while appearing to the PD to be operating according to the second power via MDI scheme comprises facilitating the PSE to deliver power according to the first power via MDI scheme while appearing to the PD to be delivering power according to the second power via MDI scheme; and facilitating the PD to operate according to the second power via MDI scheme while appearing to the PSE to be operating according to the first power via MDI scheme comprises facilitating the PD to receive power according to the second power via MDI scheme while appearing to the PSE to be receiving power according to the first power via MDI scheme.

14. The method of claim 13, comprising:

receiving power from the PSE according to the first power via MDI scheme, the power received from the PSE according to the first power via MDI scheme having a first voltage level; and delivering power to the PD according to the second power via MDI scheme, the power delivered according to the second power via MDI scheme having a second voltage level, the second voltage level being different than the first voltage level.

15. The method of claim 14, comprising, in response to receiving power from the PSE according to the first power via MDI scheme, increasing a voltage level of the power received from the PSE to the second voltage level, the second voltage level being greater than the first voltage level.

16. The network power system of claim 9, wherein the power compatibility module is configured to:

when facilitating the PSE to operate according to the first power via MDI scheme while appearing to the DTE to be operating according to the second power via MDI scheme, facilitating the PSE to deliver power according to the first power via MDI scheme while appearing to the DTE to be delivering power according to the second power via MDI scheme; and When facilitating the DTE to operate according to the second power via MDI scheme while appearing to the PSE to be operating according to the first power via MDI scheme, facilitating the DTE to receive power according to the second power via MDI scheme while appearing to the PSE to be receiving power according to the first power via MDI scheme.

17. The network power system of claim 16, wherein the power compatibility module is configured to:

receive power from the PSE according to the first power via MDI scheme, the power received from the PSE according to the first power via MDI scheme having a first voltage level; and deliver power to the DTE according to the second power via MDI scheme, the power delivered according to the second power via MDI scheme having a second voltage level, the second voltage level being different than the first voltage level.

18. The network power system of claim 17, wherein the power compatibility module is configured to, in response to receiving power from the PSE according to the first power via MDI scheme, increase a voltage level of the power received from the PSE to the second voltage level, the second voltage level being greater than the first voltage level.

19. The method of claim 1, wherein the PSE is configured to exchange data signals with the PD.

20. The method of claim 15, wherein, in response to receiving power from the PSE according to the first power via MDI scheme, detecting the voltage level of the power received from the PSE is lower than an amount of power required by the PD according to a power classification of the PD; and in response to detecting, delivering power to the PD wherein the power has the second voltage level, the second voltage level being greater than the first voltage level.

* * * * *